United States Patent
Marzetta et al.

(10) Patent No.: US 8,594,215 B2
(45) Date of Patent: Nov. 26, 2013

(54) MIMO SYSTEM HAVING A PLURALITY OF SERVICE ANTENNAS FOR DATA TRANSMISSION THEREOF

(75) Inventors: Thomas L. Marzetta, Summit, NJ (US); Alexei Ashikhmin, Morristown, NJ (US)

(73) Assignee: Alcatel Lucent, Paris (FR)

( * ) Notice: Subject to any disclaimer, the term of this patent is extended or adjusted under 35 U.S.C. 154(b) by 253 days.

(21) Appl. No.: 13/155,733

(22) Filed: Jun. 8, 2011

(65) Prior Publication Data

US 2011/0305291 A1    Dec. 15, 2011

Related U.S. Application Data

(60) Provisional application No. 61/353,922, filed on Jun. 11, 2010.

(51) Int. Cl.
*H04K 1/10* (2006.01)
*H04L 27/28* (2006.01)

(52) U.S. Cl.
USPC ............ 375/260; 375/285; 375/296; 375/346

(58) Field of Classification Search
USPC ......... 375/259–260, 267, 285, 295–296, 316, 375/340, 346–347, 349
See application file for complete search history.

(56) References Cited

U.S. PATENT DOCUMENTS

| | | | |
|---|---|---|---|
| 6,363,121 B1 * | 3/2002 | Hochwald et al. ............ | 375/260 |
| 7,508,808 B2 | 3/2009 | Marzetta | |
| 8,195,184 B2 * | 6/2012 | Kent et al. .................. | 455/452.2 |
| 8,391,429 B2 * | 3/2013 | Mergen et al. ................. | 375/350 |
| 8,432,993 B2 * | 4/2013 | Zangi et al. ..................... | 375/267 |
| 8,451,951 B2 * | 5/2013 | Caire et al. ..................... | 375/340 |
| 2003/0084398 A1 * | 5/2003 | Nguyen ........................ | 714/786 |
| 2008/0130805 A1 * | 6/2008 | Wang ............................ | 375/350 |
| 2009/0075686 A1 * | 3/2009 | Gomadam et al. ............ | 455/500 |
| 2009/0252247 A1 * | 10/2009 | Lee et al. ....................... | 375/267 |
| 2009/0323773 A1 * | 12/2009 | Bala et al. ...................... | 375/141 |
| 2010/0002607 A1 * | 1/2010 | Kim et al. ...................... | 370/280 |
| 2010/0074356 A1 | 3/2010 | Ashikhmin | |
| 2010/0166097 A1 * | 7/2010 | Zhou et al. ..................... | 375/267 |
| 2010/0189200 A1 * | 7/2010 | Choi et al. ..................... | 375/341 |
| 2010/0203912 A1 | 8/2010 | Ashikhmin et al. | |
| 2010/0215113 A1 * | 8/2010 | Lindgren et al. .............. | 375/267 |
| 2010/0232525 A1 * | 9/2010 | Xia et al. ....................... | 375/259 |

(Continued)

OTHER PUBLICATIONS

International Search Report mailed Oct. 7, 2011 in corresponding International Application No. PCT/US2011/039703.

(Continued)

*Primary Examiner* — Jean B Corrielus
(74) *Attorney, Agent, or Firm* — Harness, Dickey & Pierce, PLC.

(57) ABSTRACT

Embodiments provide a MIMO system having a plurality of service antennas and method for data transmission and reception. The system includes a plurality of service antennas, where each service antenna is configured to simultaneously serve a plurality of terminals and independently receive a pilot sequence from the plurality of terminals. The system further includes a plurality of channel estimation units configured to independently generate an antenna-specific channel estimate based on the received pilot sequence and a plurality of pre-coding units configured to independently generate a coded signal to be transmitted to the plurality of terminals via a respective service antenna based on a set of data symbols and the antenna-specific channel estimate.

20 Claims, 7 Drawing Sheets

(56) References Cited

U.S. PATENT DOCUMENTS

| | | |
|---|---|---|
| 2010/0272207 A1* | 10/2010 | Zangi et al. .................... 375/267 |
| 2011/0038436 A1* | 2/2011 | Kim et al. ...................... 375/260 |
| 2011/0128917 A1* | 6/2011 | Ko et al. ........................ 370/328 |
| 2011/0170623 A1* | 7/2011 | Park et al. ..................... 375/260 |
| 2013/0022144 A1* | 1/2013 | Kotecha et al. ............... 375/267 |

OTHER PUBLICATIONS

Zhang et al., "On Multiuser MIMO Multistream Transmission", *IEEE Transactions on Vehicular Technology*, vol. 58, No. 9, Nov. 2009.

Lee et al., "A Per-User Successive MMSE Precoding Technique in Multiuser MIMO Systems", *IEEE VTS Vehicular Technology Conference*, NY, USA, XP031093056, pp. 2374-2378, Apr. 1, 2007.

* cited by examiner

MIMO SYSTEM HAVING A PLURALITY OF SERVICE ANTENNAS FOR DATA TRANSMISSION THEREOF

PRIORITY INFORMATION

This U.S. non-provisional patent application claims priority under 35 U.S.C. §119 to U.S. provisional patent application No. 61/353,922, filed on Jun. 11, 2010, the entire contents of which are incorporated herein by reference.

BACKGROUND

Multiple-input-multiple-output (MIMO) systems represent an advance in wireless communication. MIMO systems employ one or more (e.g., multiple) antennas at the transmitting and receiving ends of a wireless link to improve the data transmission rate, while holding radio bandwidth and power constant.

A MIMO transmitter transmits an outgoing signal using multiple service antennas by demultiplexing the outgoing signal into multiple sub-signals and transmitting the sub-signals from separate antennas. MIMO exploits the multiple signal propagation paths to increase throughput, reduce bit error rates, and reduce transmission power.

FIG. 1 illustrates a multi-user multiple-input-multiple-output (MIMO) wireless system having a conventional centralized architecture.

Referring to FIG. 1, a base station 100 includes a plurality of service antennas 120 (i.e., antenna 120-1 to antenna 120-M), one central channel estimation unit 130, and one central pre-coding unit 140. The number of service antennas 120 in the conventional system is typically 4 or 8, for example. After data to be transmitted has been pre-coded by the central pre-coding unit 140 (as further explained below), the base station 100 transmits an outgoing signal including the pre-coded data using the plurality of antennas 120 by demultiplexing the outgoing signal into multiple sub-signals and transmitting the sub-signals from separate service antennas to a plurality of independently-operated terminals 110 (i.e., terminal 110-1 to terminal 110-K). The plurality of terminals 110 are equipped with one or more antennas. For the sake of clarity, it is assumed that all terminals 110 are equipped with only a single antenna.

A typical method of channel estimation in the conventional art is the linear regression estimator and a typical method of pre-coding in the conventional art is Zero-Forcing (ZF) via the pseudo-inverse, which is further explained below.

The central channel estimation unit 130 estimates the communication channel between the plurality of terminals 110 and the plurality of antennas 120. For example, the central estimation unit 130 may receive pilot sequences from the plurality of terminals 110 and estimate the channel condition based on the received pilot sequences. For example, $h_{ij}$ may refer to the channel coefficient between the i-th terminal of the plurality of terminals 110 and the j-th antenna of the plurality of service antennas 120, where i-th refers to any one of the terminals 110 and j-th refers to any one of the antennas 120. That is, the signal sent by the i-th terminal to the j-th antenna is multiplied by the channel coefficient $h_{ij}$. Similarly, via reciprocity, the signal sent by j-th antenna to the i-th terminal is also multiplied by the channel coefficient $h_{ij}$. The channel estimation vector for the j-th antenna may be denoted by:

$$h_j = \begin{bmatrix} h_{1j} \\ \vdots \\ h_{Kj} \end{bmatrix} \quad \text{Eq. 1}$$

The channel estimation between the plurality of service antennas 120 and the plurality of terminals 110 may be denoted by the matrix:

$$H = [h_1 h_2 \ldots h_M] \quad \text{Eq. 2}$$

Matrix H is an K-by-M channel matrix, formed by the channel vectors of the corresponding antennas.

During the pilot transmission phase, terminal 110-1 through terminal 110-K transmit pilot sequences $\{\phi_1, \ldots, \phi_K\}$, where each pilot sequence is a column vector. It is advantageous for the different pilot sequences to be substantially mutually orthogonal. For example, the j-th antenna of the plurality of service antennas 120 receives the following pilot sequence vector:

$$y_j = h_{1j} \cdot \phi_1 + \ldots + h_{Kj} \cdot \phi_K + \text{additive noise}. \quad \text{Eq. 3}$$

Referring to FIG. 1, the central channel estimation unit 130 collects all the vectors $y_j$, where $j=1, \ldots, M$, and forms the matrix:

$$Y = [y_1 \ldots y_M] \quad \text{Eq. 4}$$

Then, the central channel estimation unit 130 computes an estimate of the channel matrix H as follows:

$$\hat{H} = c \cdot \begin{bmatrix} \varphi_1^T \\ \vdots \\ \varphi_K^T \end{bmatrix} \cdot Y \quad \text{Eq. 5}$$

The superscript "T" refers to transposition and conjugation, and c is a constant. In some implementations, such as minimum mean-square estimation, a different constant is applied to each of the K channel estimates.

The central estimation unit 130 transfers the channel estimate $\hat{H}$ to the central pre-coding unit 140. The central pre-coding unit 130 receives data to be transferred to the plurality of service antennas (i.e., $\{q_1, \ldots, q_K\}$), and pre-codes the data. The pre-coded data is then transmitted via the plurality antennas 120. For instance, the plurality of service antennas 120 transmits their respective coded signals (i.e., $\{s_1, \ldots, s_M\}$) to the plurality of terminals 110. Pre-coding is generalized beamforming that supports spatially-multiplexed transmission in multi-user MIMO systems. Pre-coding enables multiple streams of signals to be emitted from the transmit service antennas with independent and appropriate weighting per each antenna such that each terminal receives the data intended for itself with minimal interference from data sent to other terminals.

After receiving the channel estimation $\hat{H}$, the central pre-coding unit 140 calculates the following pre-coding matrix (e.g., the pseudo-inverse of the channel estimate):

$$A = \sqrt{p} \cdot \hat{H}^T \cdot (\hat{H} \cdot \hat{H}^T)^{-1} \quad \text{Eq. 6}$$

P is a normalization constant that defines the base station transmission power.

Based on the pre-coding matrix A, the central pre-coding unit 140 precodes signals $\{q_1, \ldots, q_K\}$ by computing the following vector:

$$s = \begin{bmatrix} s_1 \\ \vdots \\ s_M \end{bmatrix} = A \cdot \begin{bmatrix} q_1 \\ \vdots \\ q_K \end{bmatrix} \quad \text{Eq. 7}$$

Signals $s_1$ to $s_M$ are transferred to their respective service antennas for transmission. For example, signal $s_1$ is transferred to antenna 120-1 and signal $s_M$ is transferred to antenna 120-M.

As described above, the conventional system includes a small number of antennas 120, which are all connected to the channel estimation unit 130 and the pre-coding unit 140. However, if the number of service antennas is increased to a number substantially larger than 4 or 8, the complexity of the conventional system greatly increases. For example, as the number of service antennas increases, the complexity of computing Eqs. 6 and 7 in the pre-coding unit 140 grows quadratically with the number of antennas.

In a multi-user MIMO system having a conventional centralized architecture, data is typically transmitted over the reverse-link as follows. Each of the K terminals transmits a data symbol, and each of the M service antennas receives a combination of all K data symbols as modified by the channel. The j-th service antenna receives the signal $x_j = q_1 \cdot h_{1j} + \ldots + q_K \cdot h_{Kj}$+additive noise. A central de-coding unit uses the channel estimates to decode the M received signals. The so-called zero-forcing receiver utilizes the pseudo-inverse of the channel estimate to obtain estimates for the K data symbols as follows, $[\hat{q}_1 \ldots \hat{q}_K] = [x_1 \ldots x_M] \cdot \hat{H}^T \cdot (\hat{H}\hat{H}^T)^{-1}$. Other commonly-used decoding schemes includes minimum mean-square estimation, and successive nulling and cancellation. All of these decoding schemes require that a centralized decoder have access to all of the M received signals as well as the channel estimates. The computational burden of these decoding schemes grows quadratically with the number of service antennas.

SUMMARY

Embodiments provide a MIMO system having a plurality of service antennas and method for data transmission and reception.

The system includes a plurality of service antennas, where each service antenna is configured to simultaneously serve a plurality of terminals, and independently receive a pilot sequence from the plurality of terminals. The system further includes a plurality of channel estimation units, where each channel estimation unit is associated with a different one of the plurality of service antennas and configured to independently generate an antenna-specific channel estimate based on the received pilot sequence. The antenna-specific channel estimate is a channel estimate between the plurality of terminals and a respective one of the plurality of service antennas. The system further includes a plurality of pre-coding units, where each pre-coding unit is associated with a different one of the plurality of channel estimation units and configured to receive a set of data symbols to be transmitted and a respective generated antenna-specific channel estimate. Each pre-coding unit is configured to independently generate a coded signal to be transmitted to the plurality of terminals via a respective service antenna based on the set of data symbols and the antenna-specific channel estimate.

Each pre-coding unit generates the coded signal based on a conjugate-transpose of the antenna-specific channel estimate. Further, each pre-coding unit generates the coded signal by calculating an inner product between the conjugate-transpose of the antenna-specific channel estimate and the set of data symbols.

In one embodiment, the plurality of service antennas are randomly distributed in at least two different location areas. Alternatively, the plurality of service antennas are arranged in one of (i) a single group and (ii) a plurality of groups, each group corresponding to a different location area.

In one embodiment, a ratio between a number of the plurality of service antennas and a number of the plurality of terminals is equal to or above a threshold level.

The system may further include a data controller configured to independently transmit the set of data symbols to each pre-coding unit.

In another embodiment, a first pre-coding unit may receives the set of data symbols from a data controller and transmits the set of data symbols to a second pre-coding unit, and the receiving and transmitting operations are repeated until a last pre-coding unit of the plurality of pre-coding units.

The system may include a plurality of service antennas, where each service antenna is configured to simultaneously serve a plurality of terminals and independently receive a pilot sequence from the plurality of terminals. The system further includes a plurality of channel estimation units, where each channel estimation unit is associated with a different one of the plurality of service antennas and configured to independently generate an antenna-specific channel estimate based on the received pilot sequence. The antenna-specific channel estimate is a channel estimate between the plurality of terminals and a respective one of the plurality of service antennas. Further, the system includes a plurality of de-coding units, where each de-coding unit is associated with a different one of the plurality of channel estimation units and configured to receive a set of data-bearing signals from the plurality of terminals and a respective antenna-specific channel estimate. Each de-coding unit is configured to independently generate a decoded signal for each of the plurality of terminals based on the set of data-bearing signals and the antenna-specific channel estimate.

Each de-coding unit generates the decoded signal based on a conjugate-transpose of the antenna-specific channel estimate. Further, each de-coding unit generates the decoded signal by multiplying the set of data-bearing signals with the conjugate-transpose of the antenna-specific channel estimate.

The system may further include a summation unit configured to receive each decoded signal from the plurality of de-coding units and sum each decoded signal to produce a resulting summed signal.

Alternatively, the system may include a first de-coding unit that transmits a first decoded signal to a second de-coding unit, and the second de-coding unit adds the first decoded signal with a second decoded signal, and the transmitting and adding operations are repeated until a last de-coding unit in the plurality of de-coding unit. The last de-coding unit generates a resulting summed signal.

In one embodiment, the plurality of service antennas are randomly distributed in different location areas. Alternatively, the plurality of service antennas are arranged in one of (i) a single group and (ii) a plurality of groups, each group corresponding to a different location area.

In one embodiment, a ratio between a number of the plurality of service antennas and a number of the plurality of terminals is equal to or above a threshold level.

The method may include independently receiving, by each service antenna, a pilot sequence from the plurality of terminals, independently generating, by each channel estimation unit, an antenna-specific channel estimate based on the received pilot sequence, where the antenna-specific channel estimate is a channel estimate between the plurality of terminals and a respective one of the plurality of service antennas, receiving, by each pre-coding unit, a set of data symbols to be transmitted and a respective generated antenna-specific channel estimate, and independently generating, by each pre-coding unit, a coded signal to be transmitted to the plurality of terminals via a respective service antenna based on the set of data symbols and the respective antenna-specific channel estimate.

The independently generating step generates the coded signal based on a conjugate-transpose of the antenna-specific channel estimate. Further, the independently generating step generates the coded signal by calculating an inner product between the conjugate-transpose of the antenna-specific channel estimate and the set of data symbols.

The method may also include independently receiving, by each service antenna, a pilot sequence from the plurality of terminals, independently generating, by each channel estimation unit, an antenna-specific channel estimate based on the received pilot sequence, where the antenna-specific channel estimate is a channel estimate between the plurality of terminals and a respective one of the plurality of service antennas, receiving, by each de-coding unit, a set of data-bearing signals from the plurality of terminals and a respective antenna-specific channel estimate, and independently generating, by each de-coding unit, a decoded signal based on the set of data-bearing signals and the antenna-specific channel estimate.

The independently generating step generates the decoded signal based on a conjugate-transpose of the antenna-specific channel estimate. Further, the independently generating step generates the decoded signal by multiplying the set of data-bearing signals with the conjugate-transpose of the antenna-specific channel estimate.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Figure 1:
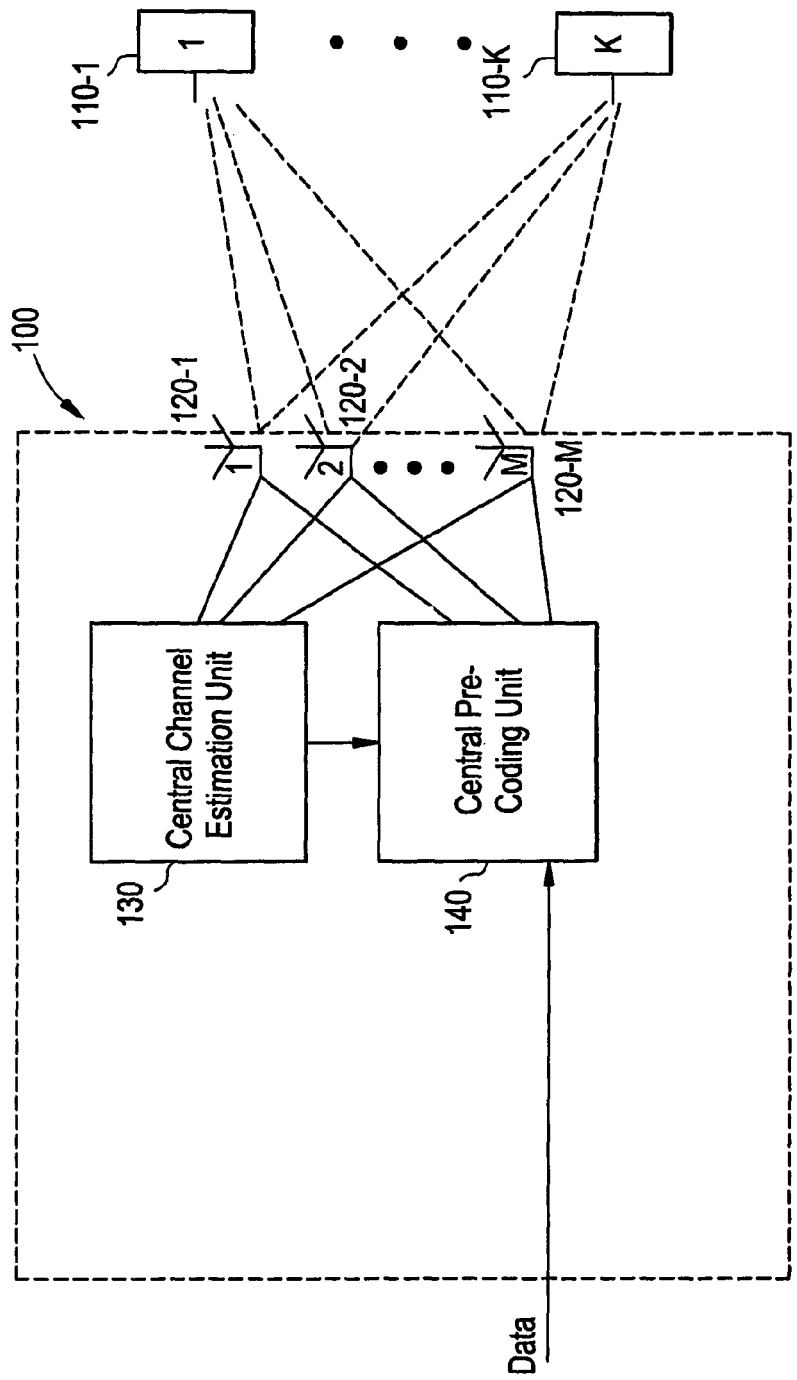
FIG. 1 illustrates a multi-user multiple-input-multiple-output (MIMO) wireless system having a conventional architecture.

Various example embodiments will now be described more fully with reference to the accompanying drawings in which some example embodiments are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the fog in of flowcharts) that may be implemented as program modules or functional processes that include routines, programs, objects, components, data structures, etc., that when executed perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like machines that once programmed become particular machines.

It should be borne in mind, however, that all of these and similar terms are to be associated with the appropriate physical quantities and are merely convenient labels applied to these quantities. Unless specifically stated otherwise, or as is apparent from the discussion, terms such as "generating", "summing", "configuring" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As used herein, the term "terminal" may be considered synonymous to, and may hereafter be occasionally referred to, as a client, mobile unit, mobile station, mobile user, user equipment (UE), subscriber, user, remote station, access terminal, receiver, etc., and may describe a remote user of wireless resources in a wireless communication network. In the MIMO system, a terminal may have one or more antennas.

Similarly, as used herein, the term "base station" may be considered synonymous to, and may hereafter be occasionally referred to, as a Node B, base transceiver station (BTS), etc., and may describe a transceiver in communication with and providing wireless resources to mobiles in a wireless communication network. As discussed herein, base stations may have all functionally associated with conventional, well-known base stations in addition to the capability to perform the methods discussed herein.

Embodiments of the present disclosure provide a multi-user multiple-input and multiple-output (MIMO) system for data transmission and reception that utilizes a relatively large number of service antennas in relation to the number of independently operated terminals.

The inventors of the present disclosure have recognized the benefits of using a large number of service antennas in relation to the number of independently operated terminals. An architecture of using such a large number of service antennas provides improved throughput and spectral efficiency. For example, this type of architecture may simultaneously transmit signals of information to many terminals at once using the same time-frequency slots (e.g., in spatial multiplexing). Further, because many different signals are transmitted over the communication channel, the beamforming of these signals may be more focused, and, as a result, decrease the amount of radiated power.

Further, the inventors of the present disclosure have recognized as the number of service antennas, M, grows large as compared with the number of terminals being served, K, the M-component propagation vectors to different terminals, as functions of frequency, become asymptotically orthogonal. This permits the pseudo-inverse pre-coder of the conventional art (which is the source of the complexity of the conventional system) to be replaced by a simpler pre-coder, which may be a scaled conjugate-transpose of the estimated channel matrix, as further described below. The pre-coder of the embodiments allows a more decentralized architecture in which a) each service antenna retains its own channel estimate for the communication channel between itself and the K terminals and shares this information with no other service antenna, and b) each antenna performs pre-coding independently of the pre-coding performed by the other antennas (apart from amplitude scaling for power control). Similar benefits of operating with a large excess of service antennas compared with the number of terminals exist for up-link transmission of data.

Figure 2:
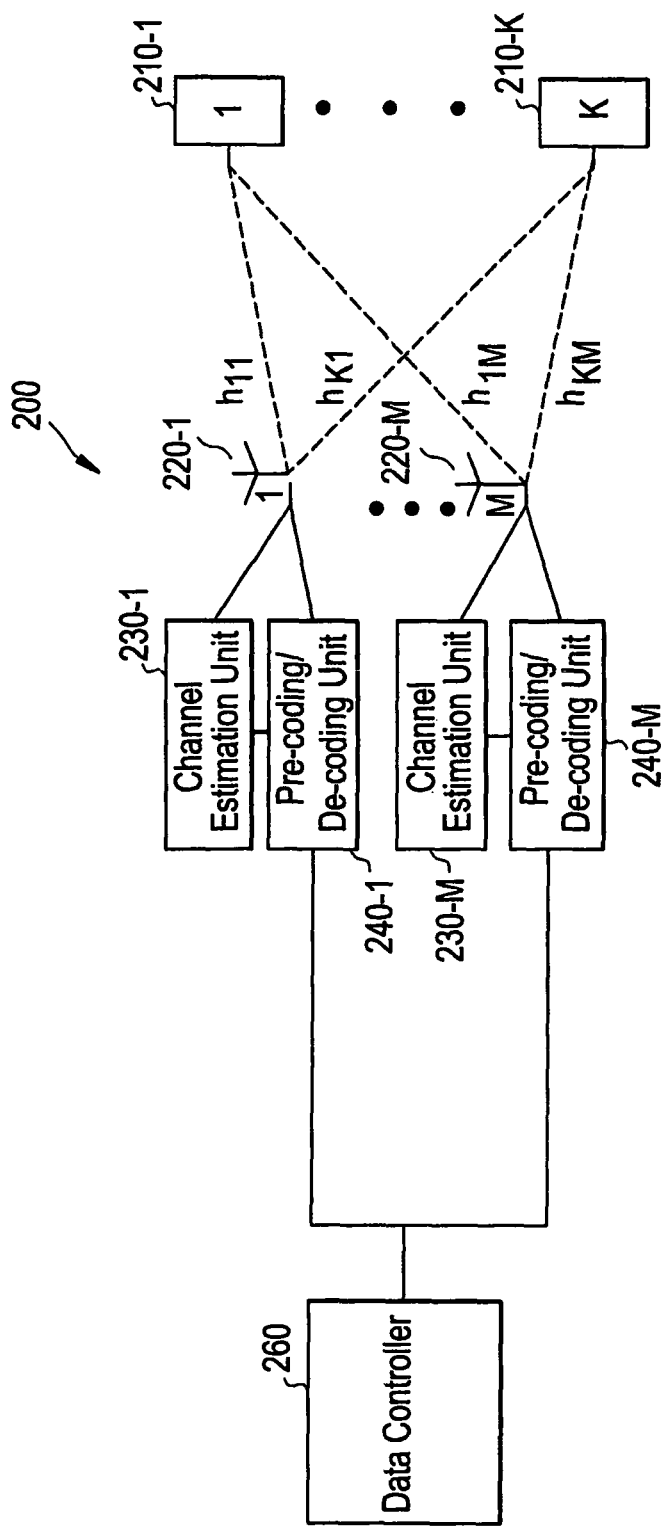
FIG. 2 illustrates a multi-user MIMO wireless system for data transmission and reception according to an embodiment.

FIG. 2 illustrates a multi-user MIMO wireless system 200 for data transmission and reception according to an embodiment.

The MIMO wireless system 200 includes a data controller 260, a plurality of channel estimation units 230 (e.g., a first channel estimation unit 230-1 to a last channel estimation unit 230-M), a plurality of pre-coding/de-coding units 240 (e.g., a first pre-coding/de-coding unit 240-1 to a last pre-coding/de-coding unit 240-M), a plurality of service antennas 220 (e.g., a first service antenna 220-1 to a last service antenna 220-M), and a plurality of independently operated terminals 210 (e.g., a first terminal 210-1 to a last terminal 210-K). When the "coding unit" is de-coding a signal, the unit 240 is referred to as a de-coding unit, and when the "coding unit" is pre-coding a signal, the unit 240 is referred to a pre-coding unit.

The MIMO system 200 may include a time division duplexing (TDD) orthogonal frequency division multiplexing (OFDM) system. Under TDD, data transmissions in the uplink (from terminal to base station) and downlink (from base station to terminal) occupy disjoint intervals of time, and utilize the same frequency band. Time-division duplex operation is particularly efficient for the acquisition of downlink channel information by the service antennas, because the time occupied by the pilot sequences is then independent of the number of service antennas. However, it will be understood that embodiments may be implemented in other MIMO systems as well as other wireless communication systems and/or schemes. For example, methods discussed herein may be implemented in connection with a frequency division duplexing (FDD) or similar scheme.

As shown in FIG. 2, a separate channel estimation unit 230 and separate pre-coding/de-coding unit 240 are independently provided for each service antenna 220. In other words, each channel estimation unit 230 is associated with a different service antenna 220, and each pre-coding/de-coding unit 240 is associated with a different channel estimation unit 230.

Alternatively, each channel estimation unit 230 may be indirectly or directly connected to a different service antenna 220, and each pre-coding/de-coding unit 240 may be indirectly or directly connected to a different channel estimation unit 230. As such, one channel estimation unit, one pre-coding/de-coding unit, and one service antenna may be bundled as a block. In this embodiment, the MIMO wireless system 200 includes a plurality of blocks, where each block has the capacity to independently estimate the channel condition, pre-code or de-code a signal, and transmit and/or receive the signal on the reverse/forward link communication channel without the intervention of the other blocks.

The MIMO wireless system 200 may include other components that are well known to one of ordinary skill in the art. For example, FIG. 2 illustrates a base-band representation of the operation of the system, and certain customary features are not shown, including modules for assembling and disassembling OFDM pulses, modules for adding or removing cyclic prefixes, up-converters and down-converters, and power amplifiers and pre-amplifiers. In addition, a separate modulation/demodulation unit may be provided for each pre-coding/de-coding unit.

The plurality of service antennas 220 may be provided in a single location area such as a centrally located base station. Alternatively, the plurality of service antennas 220 may be arranged in at least two different location areas such as two different base stations located in different areas. Further, the plurality of antennas 220 may be randomly distributed in one or more location areas.

A ratio between a number of the plurality of service antennas 220 and a number of the plurality of terminals 210 may be equal to or above a threshold level. For example, the number of service antennas 220 may be 400 and the number of terminals 210 may be 40. As such, in one particular embodiment, the ratio of service antennas to terminals is the threshold level of 10. However, the embodiments encompass any type of value for the threshold value such that the ratio of the number of service antennas 220 to the number of terminals 210 is relatively large.

The plurality of service antennas 220 are configured to simultaneously serve the plurality of terminals 210 through multi-user MIMO. Forward-link data transmission includes the simultaneous (over frequency and over time) transmission of K separate data streams to the K terminals 210 over an air interface. The air interface may include any type of radio-based communication link between two network elements according to any type of standard that is well known to one of ordinary skill in the art. Reverse-link data transmission comprises the simultaneous (over frequency and over time) transmission of separate data streams by the K terminals 210 to the service antennas 220 over the air interface.

On the forward link, the data controller 260 transmits the data streams to the plurality of pre-coding/de-coding units 240, while on the reverse link the data controller 260 receives data streams from the plurality of pre-coding/de-coding units 240. The operation of the data controller 260 is further described with reference to FIGS. 4 and 5.

Intra-cell interference (i.e. interference among the K data streams) is reduced to acceptable levels through linear pre-coding by the pre-coding/de-coding units 240 on the forward-link, and through linear combining by the pre-coding/de-coding units 240 on the reverse-link.

The pre-coding/de-coding units 240 require a channel estimate for the forward and the reverse-link channel, respectively. For a large numbers of service antennas 220, this channel-state information can be obtained by employing time-division duplex operation such that the forward and reverse-link channels are reciprocal, and scheduling an interval of time for the K terminals 210 to transmit pilot sequences on the reverse-link, as further explained below.

Figure 3:
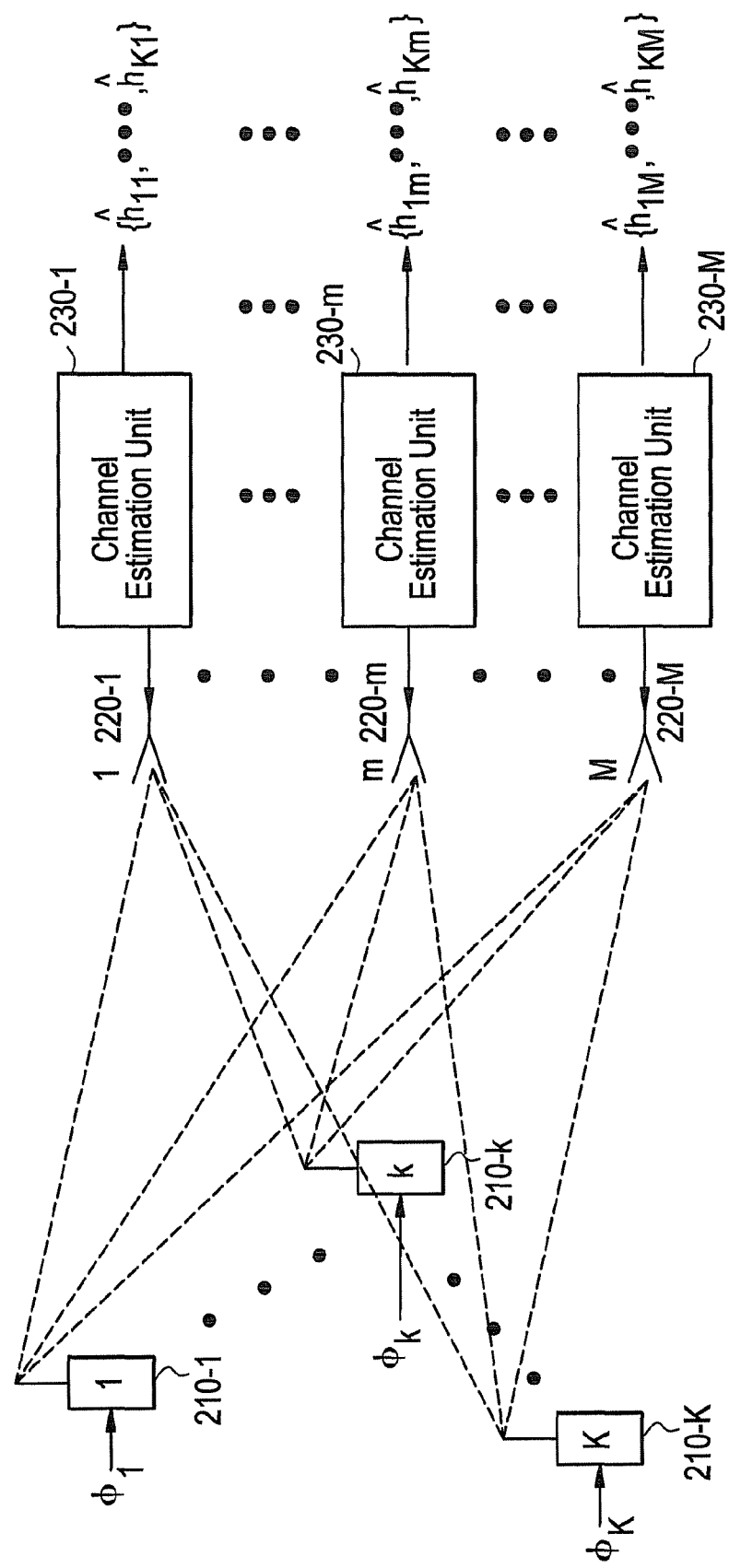
FIG. 3 illustrates a portion of the multi-user MIMO wireless system including a plurality of channel estimation units according to an embodiment.

FIG. 3 illustrates a portion of the MIMO wireless system 200 including the plurality of channel estimation units 230 according to an embodiment.

Each channel estimation unit 230 independently generates an antenna-specific channel estimate based on received pilot sequences. The antenna-specific channel estimate is a channel estimate between the plurality of terminals 210 and a respective one service antenna 220 (e.g., a first service antenna 220-1). For example, each channel estimation unit 230 independently receives pilot sequences from the plurality of terminals 210 over the air interface and independently estimates the channel condition based on the received pilot sequences.

For example, as shown in FIG. 3, the plurality of terminals 210 transmit substantially orthogonal pilot sequences $\{\phi_1, \ldots \phi_K\}$ on the reverse link, where each pilot sequence is a column vector. The co-efficient $h_{ij}$ may refer to the channel coefficient between the i-th terminal of the plurality of terminals 210 and the j-th service antenna of the plurality of service antennas 220, where the i-th terminal is any one of the plurality of terminals 210 and the j-th service antenna is any one of the plurality of service antennas 220. That is, the signal sent by the i-th terminal to the j-th antenna is multiplied by the channel coefficient $h_{ij}$. Similarly, via reciprocity, the signal sent by j-th antenna to the i-th terminal is also multiplied by the channel coefficient $h_{ij}$. The channel vector for the j-th antenna may be denoted by Eq. 1, as described above (e.g., $$\left(\text{e.g., } h_j = \begin{bmatrix} h_{1j} \\ \vdots \\ h_{Kj} \end{bmatrix}\right).$$

As such, the j-th service antenna of the plurality of service antennas 220 receives the pilot sequence vector $y_j$ as described in Eq. 3 (e.g., $y_j = h_{j1} \cdot \phi_1 + \ldots + h_{jK} \cdot \phi_K +$additive noise).

However, according to the embodiments, each channel estimation unit 230 computes its own antenna-specific channel estimation, independently from all other channel estimation units 230. In one embodiment, each channel estimation unit 230 computes the antenna-specific channel estimation based on the following equation:

$$\hat{h}_j = c \cdot \begin{bmatrix} \varphi_1^T \\ \vdots \\ \varphi_K^T \end{bmatrix} \cdot y_j \qquad \text{Eq. 8}$$

The superscript "T" refers to transposition and conjugation, and c is a constant.

In one example, the first channel estimation unit 230-1 receives the pilot sequence $y_1 = h_{11} \cdot \phi_1 + \ldots + h_{K1} \cdot \phi_K +$additive noise from the plurality of terminals 210. Because the transmitted pilot sequence $\{\phi_1, \ldots \phi_K\}$ is known to the first channel estimation unit 230-1, the first channel estimation unit 230-1 is able to compute the antenna-specific channel estimate based on Eq. 8 above. For example, as shown in FIG. 3, the first channel estimation unit 230-1 generates the antenna-specific channel estimate $\{\hat{h}_{11}, \ldots \hat{h}_{K1}\}$, where each channel coefficient in the antenna-specific channel estimate refers to a corresponding channel coefficient between a respective terminal and the first service antenna 220. The same operation is repeated for each of the plurality of channel estimation units 230.

Figure 4:
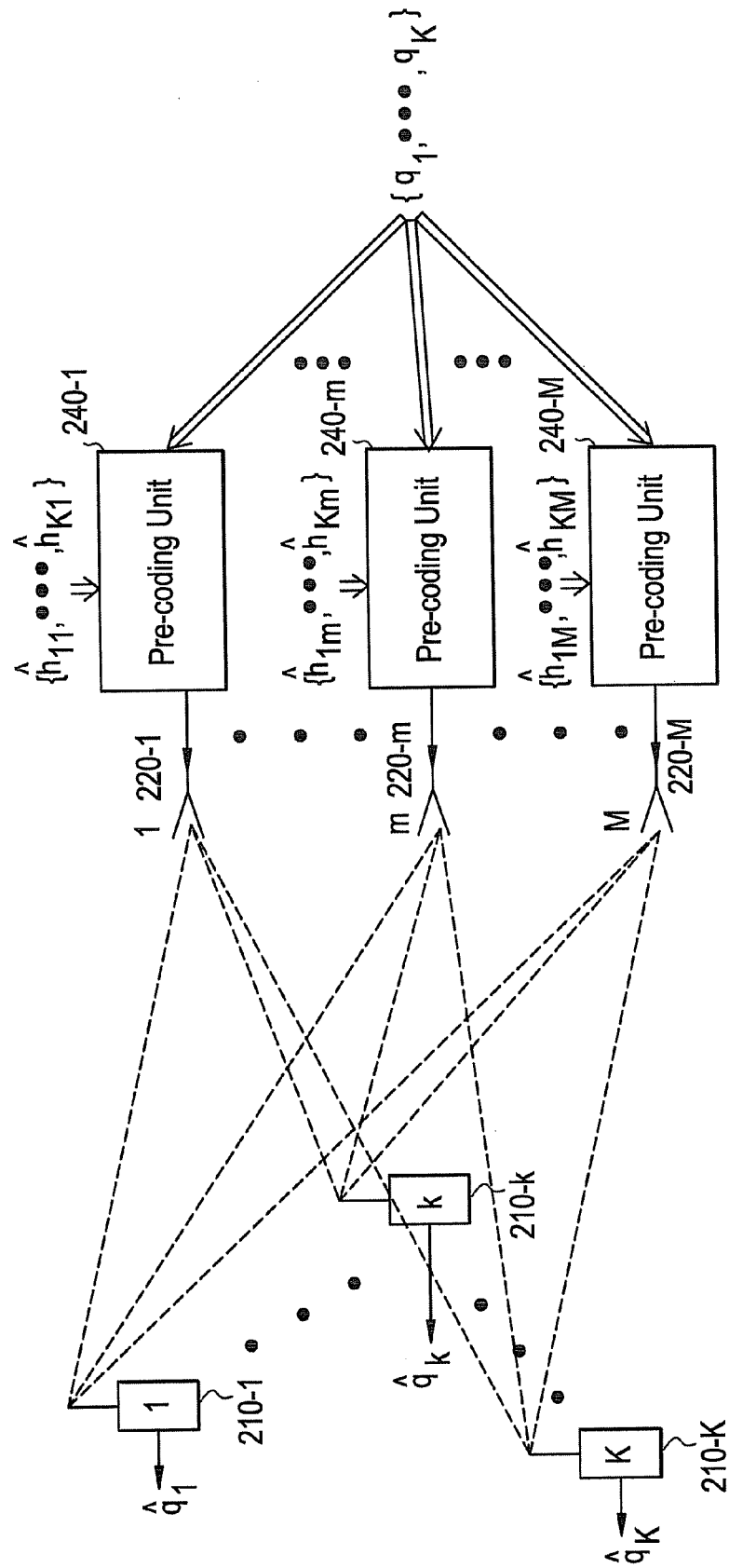
FIG. 4 illustrates a portion of the multi-user MIMO wireless system including a plurality of pre-coding units for transmission on the forward-link according to an embodiment.

FIG. 4 illustrates a portion of the MIMO wireless system 200 including the plurality of pre-coding units 240 for transmission on the forward-link according to an embodiment.

As shown in FIG. 4, each pre-coding unit 240 receives a respective antenna-specific channel estimate corresponding to its associated channel estimation unit 230 of FIG. 3. Further, each pre-coding unit 240 receives a set of data symbols to be transmitted (e.g., $\{q_1, \ldots q_K\}$) to the plurality of terminals 210 on the forward-link. The distribution of the set of data symbols may be controlled by the data controller 260 of FIG. 2. In the embodiment shown in FIG. 4, the data controller 260 independently transmits the set of data symbols to each of the pre-coding units 240. According to the embodiments, each pre-coding unit 240 independently generates a pre-coded signal to be transmitted to the plurality of antennas 210 via a respective service antenna 220 based on the set of data symbols to be transmitted and the antenna-specific channel estimate, as further explained below.

In one embodiment, each pre-coding unit 240 generates the coded signal based on a conjugate-transpose of the antenna-specific channel estimate. For example, each pre-coding unit 240 generates the coded signal by calculating an inner product between the conjugate-transpose of the antenna-specific channel estimate and the set of data symbols. For instance, each pre-coding unit 240 generates an antenna-specific pre-coding vector based on the following equation:

$$a_j = \sqrt{p} \cdot \hat{h}_j^T \qquad \text{Eq. 9}$$

The parameter p is a normalization factor, and $a_j$ is a row vector with K entries. The K entries correspond to the K terminals 210.

Next, each pre-coding unit 240 generates its coded signal (e.g. $s_j$) for its respective service antenna 220 based on the following equation:

$$s_j = a_j \cdot \begin{bmatrix} q_1 \\ \vdots \\ q_K \end{bmatrix}$$ Eq. 10

According to an embodiment, the operations in one pre-coding unit 240 and its associated channel estimation units 230 are performed without any coordination with other the pre-coding units and associated channel estimated units.

Thereafter, each service antenna 220 transmits its coded signal to the plurality of terminals 210.

Figure 5:
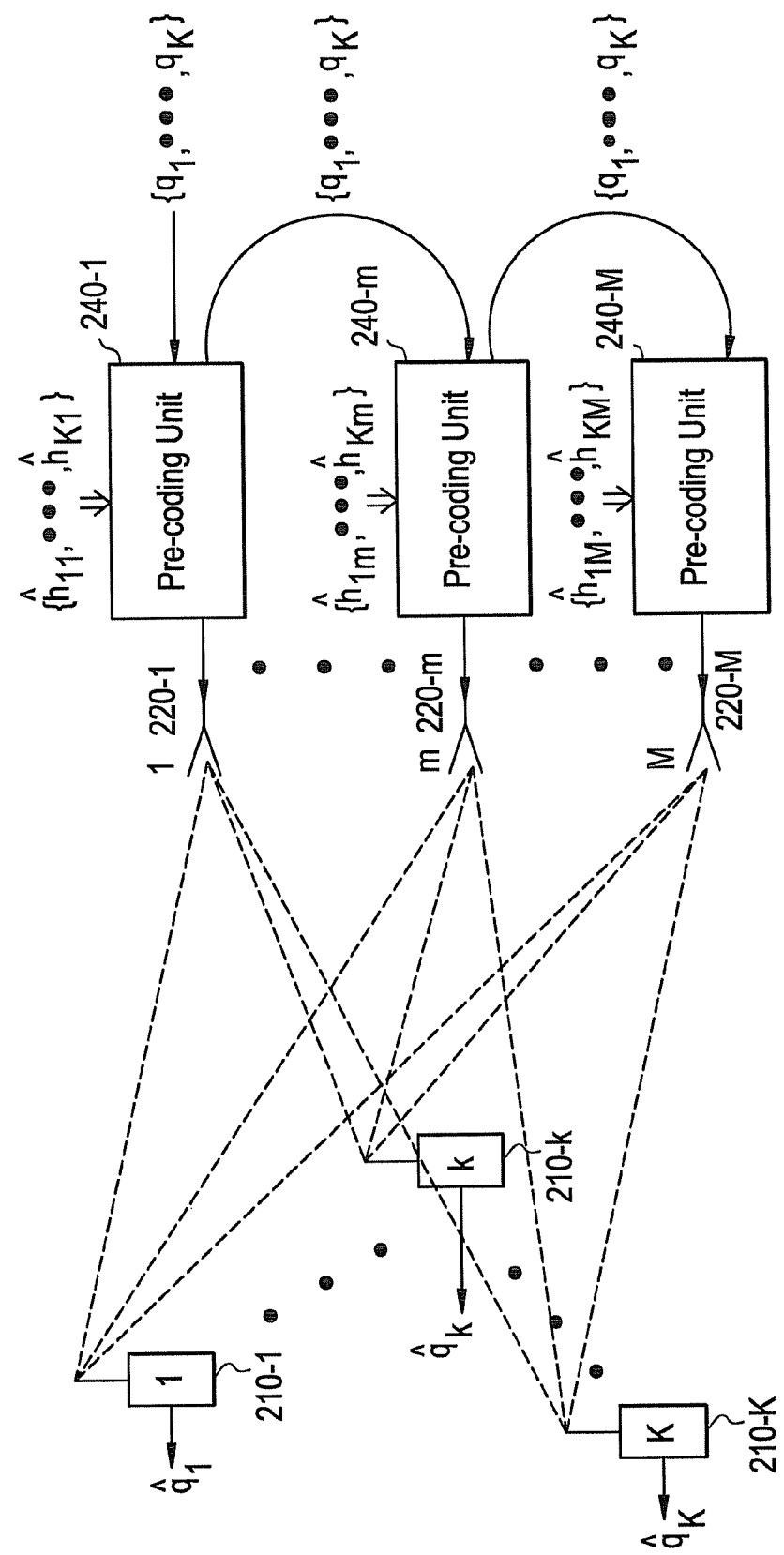
FIG. 5 illustrates a portion of the multi-user MIMO wireless system including the plurality of pre-coding units for data transmission on the forward-link according to another embodiment.

FIG. 5 illustrates a portion of the MIMO wireless system 200 including the plurality of pre-coding units 240 for data transmission on the forward-link according to another embodiment. The difference between FIG. 5 and FIG. 4 is the way the pre-coding units 240 receive the set of data symbols to be transmitted. In FIG. 5, the first pre-coding unit 240-1 receives the set of data symbols to be transmitted (e.g., $\{q_1, \ldots q_K\}$) from the data controller 260 over a communication link, and then transmits the set of data symbols to the second pre-coding unit 240-2, and the receiving and transmitting operations are repeated until a last pre-coding unit 240-M. In other words, the set of data symbols to be transmitted are distributed to the pre-coding units 240 in a daisy-chain manner. Thereafter, the pre-coding units 240 operate in the same manner as previously described with reference to FIG. 4.

A backhaul communication network may be provided in the MIMO system 200 to allow communication between each pre-coding unit 240 and/or each service antenna 220. For example, because the service antennas 220 may be randomly distributed in a de-centralized manner, the backhaul communication network provides the communication between each service antenna 220. The backhaul network could comprise any sort of conventional communications links, including wire, optical fiber, free-space optical, or wireless.

Figure 6:
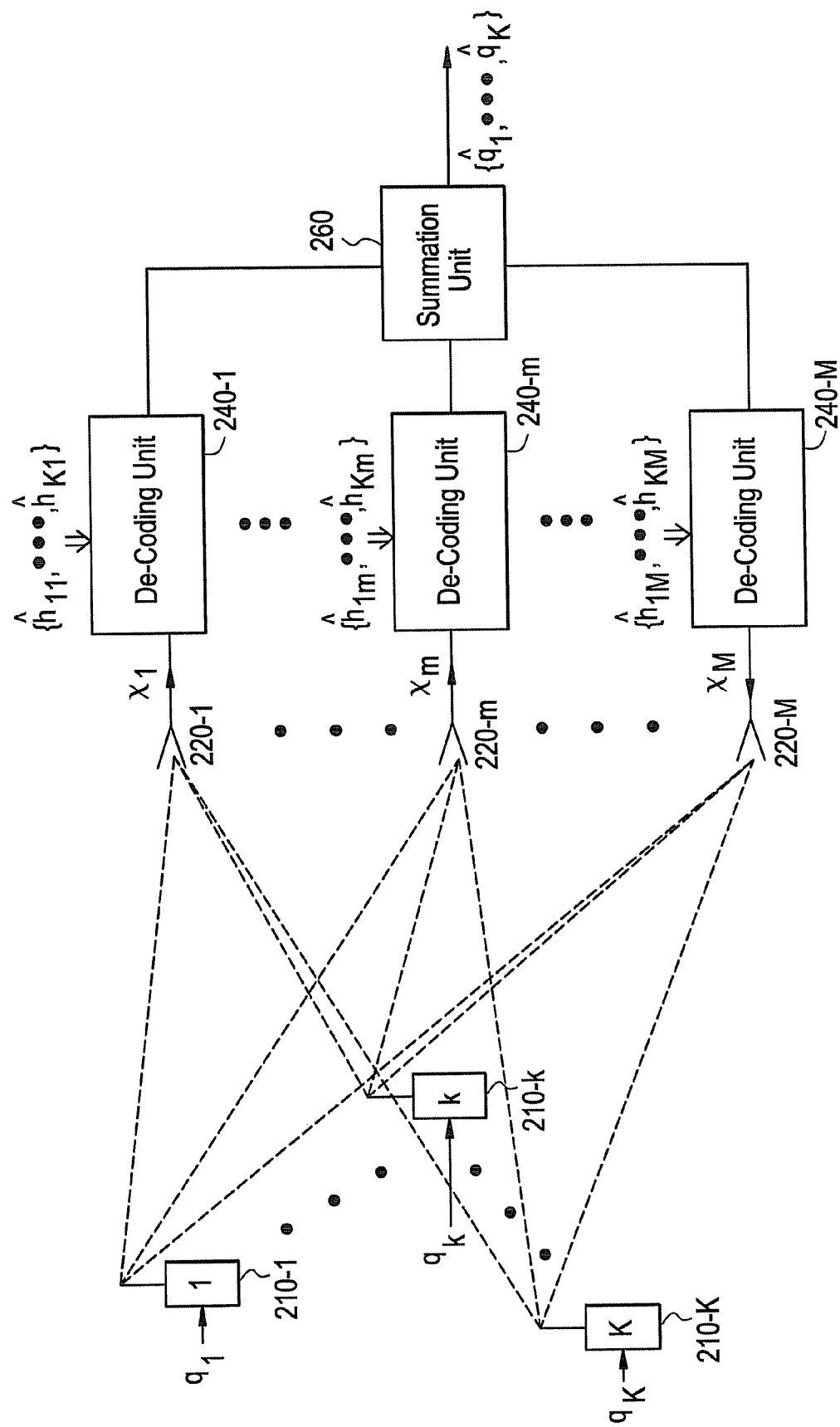
FIG. 6 illustrates a portion of the multi-user MIMO wireless system including a plurality of de-coding units for data reception on the reverse-link according to an embodiment.

FIG. 6 illustrates a portion of the MIMO wireless system 200 including the plurality of de-coding units 240 for data reception on the reverse-link according to an embodiment.

Each of the k terminals 210 transmits a data symbol to each of the service antennas 220 on the reverse-link. As such, each service antenna 220 receives a data-bearing signal corresponding to this antenna. For example, the first antenna 220-1 receives the data-bearing signal $x_1 = q_1 \cdot h_{11} + \ldots + q_k \cdot h_{K1} +$ additive noise resulting from the transmission of the plurality of data symbols from the plurality of terminals 210 corresponding to the first antenna 220-1. The other antennas 220 operate in the same manner.

According to an embodiment, each de-coding unit 240 receives a data-bearing signal and a respective antenna-specific channel estimate. The antenna-specific channel estimate is provided from an associated channel estimation unit 230. Each de-coding unit 240 is configured to independently generate a decoded signal for each of the K terminals based on the set of data-bearing signals and the antenna-specific channel estimate. The de-coding units 240 operate in a similar manner to the pre-coding units 240, as illustrated FIG. 5, except that the de-coding units 240 decode the data symbols transmitted through the communication channel. For example, similar to the pre-coding units 240, each de-coding unit 240 generates its decoded signal based on a conjugate-transpose of the antenna-specific estimate. For instance, each de-coding unit 240 generates the decoded signal by multiplying the data-bearing signal with the conjugate-transpose of the antenna-specific channel estimate.

In one example, the first de-coding unit 240-1 receives a data-bearing signal $x_1$ corresponding to data symbols from the terminals 210 associated with the first service antenna 240-1. Also, the first de-coding unit 240-1 receives the antenna-specific channel estimate associated with the terminals 210 and the first service antenna 240-1 (e.g., $\{\hat{h}_{11}, \ldots \hat{h}_{K1}\}$). The computation of the first service antenna channel estimate is the same as previously explained with reference to FIG. 3. The first de-coding unit 240-1 generates its de-coded data by multiplying $x_1$ with $[\hat{h}_{11} \ldots \hat{h}_{K1}]^T$, e.g., $[\hat{q}_{11} \ldots \hat{q}_{K1}] = x_1 \cdot [\hat{h}_{11} \ldots \hat{h}_{K1}]^T$. The other de-coding units operate in the same manner.

The MIMO wireless system 200 may also include a summation unit 260 that is configured to receive each decoded signal from the plurality of de-coding units 240, and sum each decoded signal to produce a resulting data signal, i.e., $[\hat{q}_1 \ldots \hat{q}_K] = [\hat{q}_{11} \ldots \hat{q}_{K1}] + \ldots + [\hat{q}_{1M} \ldots \hat{q}_{KM}]$.

Figure 7:
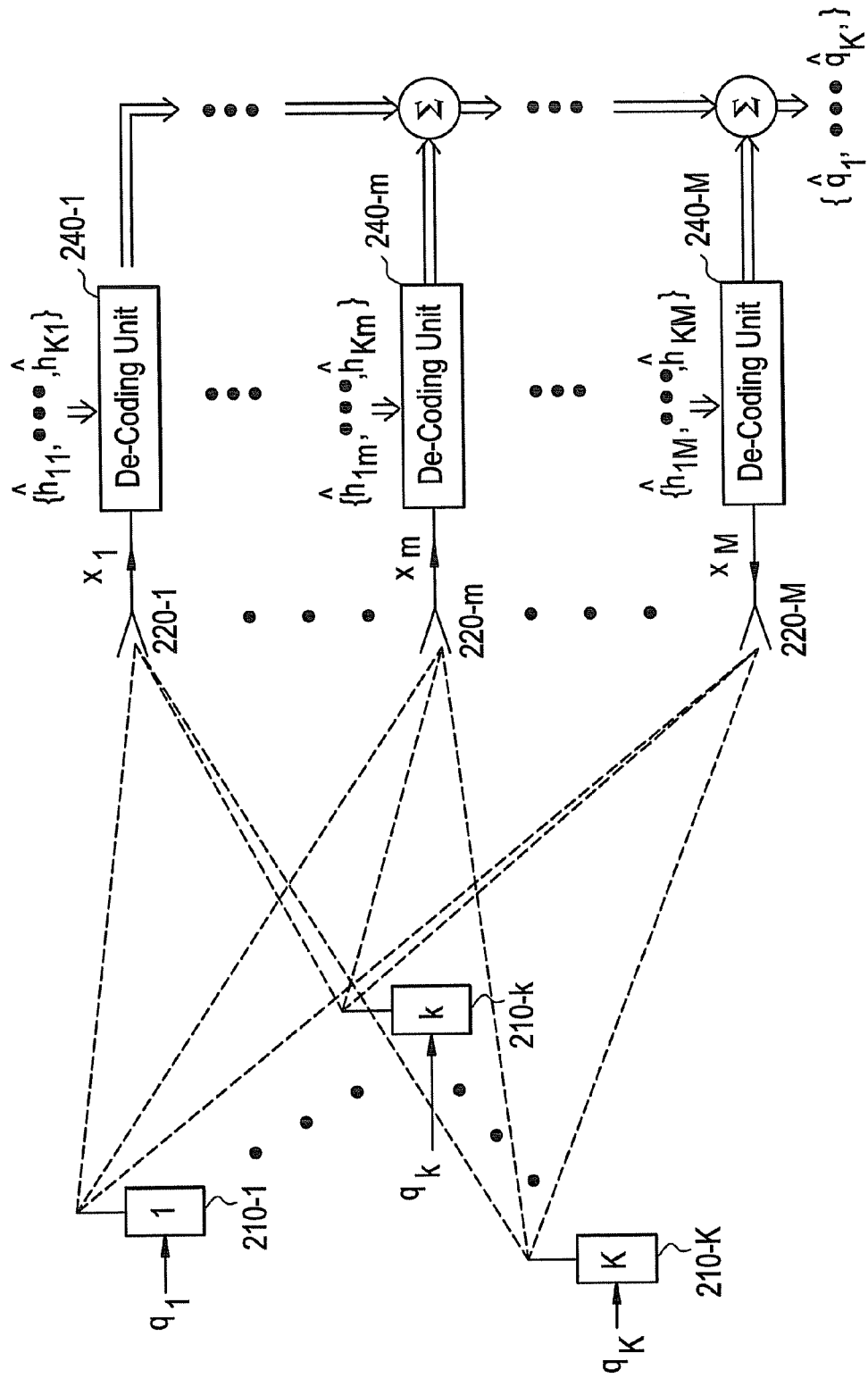
FIG. 7 illustrates a portion of the multi-user MIMO wireless system including the plurality of de-coding units for data reception on the reverse-link according to another embodiment.

FIG. 7 illustrates a portion of the MIMO wireless system 200 including the de-coding units 240 for data reception on the reverse-link according to another embodiment.

Instead of providing a summation unit 260 as shown in FIG. 6, the MIMO wireless system 200 may sum the decoded signals from the plurality of de-coding units 240 in a daisy chain manner. For example, a first de-coding unit 240-1 transmits a first decoded signal, $[\hat{q}_{11} \ldots \hat{q}_{K1}]$, to a second de-coding unit 240-2, and the second de-coding unit 240-2 adds the first decoded signal with a second decoded signal, $[\hat{q}_{12} \ldots \hat{q}_{K2}]$, (i.e., the second decoded signal being generated by the second de-coding unit 240-2), to obtain the sum, $[\hat{q}_{11} \ldots \hat{q}_{K1}] + [\hat{q}_{12} \ldots \hat{q}_{K2}]$ and the transmitting and adding operating are repeated until a last de-coding unit 240-M. The last de-coding unit 240-M produces the resulting summed signal, $[\hat{q}_1 \ldots \hat{q}_K]$.

Variations of the example embodiments are not to be regarded as a departure from the spirit and scope of the example embodiments, and all such variations as would be apparent to one skilled in the art are intended to be included within the scope of this disclosure.

What is claimed:

1. A multiple-input and multiple-output (MIMO) system for data transmission, the system comprising:
   a plurality of service antennas, each service antenna configured to simultaneously serve a plurality of terminals, each service antenna configured to independently receive a pilot sequence from the plurality of terminals;
   a plurality of channel estimation units, each channel estimation unit being associated with a different one of the plurality of service antennas and configured to independently generate an antenna-specific channel estimate based on the received pilot sequence, the antenna-specific channel estimate being a channel estimate between the plurality of terminals and a respective one of the plurality of service antennas; and
   a plurality of pre-coding units, each pre-coding unit being associated with a different one of the plurality of channel estimation units and configured to receive a set of data symbols to be transmitted and a respective generated antenna-specific channel estimate, each pre-coding unit configured to independently generate a coded signal to be transmitted to the plurality of terminals via a respective service antenna based on the set of data symbols and the antenna-specific channel estimate.

2. The system of claim 1, wherein each pre-coding unit generates the coded signal based on a conjugate-transpose of the antenna-specific channel estimate.

3. The system of claim 2, wherein each pre-coding unit generates the coded signal by calculating an inner product between the conjugate-transpose of the antenna-specific channel estimate and the set of data symbols.

4. The system of claim 1, wherein the plurality of service antennas are randomly distributed in at least two different location areas.

5. The system of claim 1, wherein the plurality of service antennas are arranged in one of (i) a single group and (ii) a plurality of groups, each group corresponding to a different location area.

6. The system of claim 1, wherein a ratio between a number of the plurality of service antennas and a number of the plurality of terminals is equal to or above a threshold level.

7. The system of claim 1, further comprising:
a data controller configured to independently transmit the set of data symbols to each pre-coding unit.

8. The system of claim 1, wherein a first pre-coding unit receives the set of data symbols from a data controller and transmits the set of data symbols to a second pre-coding unit, and the receiving and transmitting operations are repeated until a last pre-coding unit of the plurality of pre-coding units.

9. A multiple-input and multiple-output (MIMO) system for data reception, the system comprising:
a plurality of service antennas, each service antenna configured to simultaneously serve a plurality of terminals, each service antenna configured to independently receive a pilot sequence from the plurality of terminals;
a plurality of channel estimation units, each channel estimation unit being associated with a different one of the plurality of service antennas and configured to independently generate an antenna-specific channel estimate based on the received pilot sequence, the antenna-specific channel estimate being a channel estimate between the plurality of terminals and a respective one of the plurality of service antennas; and
a plurality of de-coding units, each de-coding unit being associated with a different one of the plurality of channel estimation units and configured to receive a set of data-bearing signals from the plurality of terminals and a respective antenna-specific channel estimate, each de-coding unit configured to independently generate a decoded signal for each of the plurality of terminals based on the set of data-bearing signals and the antenna-specific channel estimate, a first de-coding unit of the plurality of de-coding units configured to transmit a first decoded signal to a second de-coding unit of the plurality of de-coding units, the second de-coding unit configured to add the first decoded signal with a second decoded signal, the transmitting and the adding operations being repeated until a last de-coding unit of the plurality of de-coding unit, the last de-coding unit generating a resulting summed signal.

10. The system of claim 9, wherein each de-coding unit generates the decoded signal based on a conjugate-transpose of the antenna-specific channel estimate.

11. The system of claim 10, wherein each de-coding unit generates the decoded signal by multiplying the set of data-bearing signals with the conjugate-transpose of the antenna-specific channel estimate.

12. The system of claim 9, wherein the plurality of service antennas are randomly distributed in different location areas.

13. The system of claim 9, wherein the plurality of service antennas are arranged in one of (i) a single group and (ii) a plurality of groups, each group corresponding to a different location area.

14. The system of claim 9, wherein a ratio between a number of the plurality of service antennas and a number of the plurality of terminals is equal to or above a threshold level.

15. A method for data transmission in a multiple-input and multiple-output (MIMO) system, the MIMO system including a plurality of service antennas for simultaneously serving a plurality of terminals, a plurality of channel estimation units, and a plurality of pre-coding units, each channel estimation unit being associated with a different one of the plurality of service antennas, each pre-coding unit being associated with a different one of the plurality of channel estimation units, the method comprising:
independently receiving, by each service antenna, a pilot sequence from the plurality of terminals;
independently generating, by each channel estimation unit, an antenna-specific channel estimate based on the received pilot sequence, the antenna-specific channel estimate being a channel estimate between the plurality of terminals and a respective one of the plurality of service antennas;
receiving, by each pre-coding unit, a set of data symbols to be transmitted and a respective generated antenna-specific channel estimate; and
independently generating, by each pre-coding unit, a coded signal to be transmitted to the plurality of terminals via a respective service antenna based on the set of data symbols and the respective antenna-specific channel estimate.

16. The method of claim 15, wherein the independently generating step generates the coded signal based on a conjugate-transpose of the antenna-specific channel estimate.

17. The method of claim 16, wherein the independently generating step generates the coded signal by calculating an inner product between the conjugate-transpose of the antenna-specific channel estimate and the set of data symbols.

18. A method for data reception in a multiple-input and multiple-output (MIMO) system, the MIMO system including a plurality of service antennas for simultaneously serving a plurality of terminals, a plurality of channel estimation units, and a plurality of de-coding units, each channel estimation unit being associated with a different one of the plurality of service antennas, each de-coding unit being associated with a different one of the plurality of channel estimation units, the method comprising:
independently receiving, by each service antenna, a pilot sequence from the plurality of terminals;
independently generating, by each channel estimation unit, an antenna-specific channel estimate based on the received pilot sequence, the antenna-specific channel estimate being a channel estimate between the plurality of terminals and a respective one of the plurality of service antennas;
receiving, by each de-coding unit, a set of data-bearing signals from the plurality of terminals and a respective antenna-specific channel estimate; and
independently generating, by each de-coding unit, a decoded signal based on the set of data-bearing signals and the antenna-specific channel estimate; a first de-coding unit of the plurality of de-coding units transmitting a first decoded signal to a second de-coding unit of the plurality of de-coding units, the second de-coding unit adding the first decoded signal with a second decoded signal, the transmitting and the adding operations being repeated until a last de-coding unit of the plurality of de-coding unit, the last de-coding unit generating a resulting summed signal.

19. The method of claim 18, wherein the independently generating step generates the decoded signal based on a conjugate-transpose of the antenna-specific channel estimate.

20. The method of claim 19, wherein the independently generating step generates the decoded signal by multiplying the set of data-bearing signals with the conjugate-transpose of the antenna-specific channel estimate.

* * * * *

UNITED STATES PATENT AND TRADEMARK OFFICE
CERTIFICATE OF CORRECTION

| | | |
|---|---|---|
| PATENT NO. | : 8,594,215 B2 | Page 1 of 1 |
| APPLICATION NO. | : 13/155733 | |
| DATED | : November 26, 2013 | |
| INVENTOR(S) | : Thomas L. Marzetta et al. | |

It is certified that error appears in the above-identified patent and that said Letters Patent is hereby corrected as shown below:

On the Title page, Item (54) and in the Specification, Column 1, lines 1-3, the Title should read:

--MIMO SYSTEM HAVING A PLURALITY OF SERVICE ANTENNAS FOR DATA TRANSMISSION AND RECEPTION AND METHOD THEREOF--

Signed and Sealed this
Fourth Day of March, 2014

Michelle K. Lee
*Deputy Director of the United States Patent and Trademark Office*